(12) United States Patent
Lu

(10) Patent No.: US 6,225,981 B1
(45) Date of Patent: May 1, 2001

(54) WIRELESS COMPUTER MOUSE

(75) Inventor: Ho-Lung Lu, Taipei Hsien (TW)

(73) Assignee: Dexin Corporation, Taipei Hsien (TW)

( * ) Notice: Subject to any disclaimer, the term of this patent is extended or adjusted under 35 U.S.C. 154(b) by 0 days.

(21) Appl. No.: 09/188,698

(22) Filed: Nov. 10, 1998

(51) Int. Cl.[7] .................................................. G09G 5/08
(52) U.S. Cl. ............................................. 345/164; 345/163
(58) Field of Search ................................. 345/156–165; D14/117.1, 117.2, 117.3; 463/37

(56) References Cited

U.S. PATENT DOCUMENTS

| | | | |
|---|---|---|---|
| D. 356,558 | * 3/1995 | Montgomery et al. | D14/114 |
| 5,633,658 | * 5/1997 | Ma | 345/161 |
| 5,790,098 | * 8/1998 | Lin | 345/163 |
| 5,854,621 | * 12/1998 | Junod et al. | 345/158 |
| 6,072,470 | * 6/2000 | Ishigaki | 345/158 |

* cited by examiner

Primary Examiner—Amare Mengistu
Assistant Examiner—David L. Lewis
(74) Attorney, Agent, or Firm—Rosenberg, Klein & Lee

(57) ABSTRACT

A wireless computer mouse is characterized in that a detachable battery cover is arranged over the top housing of the mouse. The battery cover has similar shape with that of the top housing and the battery chamber is placed below the battery cover. Moreover, the battery cover has hook and inserting plate engaged into the locking hole and positioning hole on the top housing. Therefore, the battery cover is slidably arranged on the top housing and does not influence overall aesthetics.

2 Claims, 6 Drawing Sheets

WIRELESS COMPUTER MOUSE

FIELD OF THE INVENTION

The present relates to an improved computer mouse, more particularly, to an improved wireless computer mouse, which is energized by battery and communicate through infrared or radio frequency.

BACKGROUND OF THE INVENTION

The computer mouse is demanded to have additional functions such as multimedia and control function as the computer-related technology becomes more and more sophisticated. More particularly, wireless mouse is attractive due to the convenient use thereof. The wireless computer mouse is generally energized by battery and communicates through infrared transmission or radio frequency transmission to realize wireless operation. To replace the exhausted battery, the battery is often stored in a battery chamber with battery cover. As shown in FIG. 1, the battery cover 11 is generally arranged on the base house 10 of the computer mouse 1 and can be opened by pressing a knob 110. The battery cover 11 arranged on the bottom surface of the mouse 1 will not influence the aesthetic sense of the top side of the mouse. However, the arrangement of the battery cover 11 will interference the integrality of the bottom surface of the mouse 1. Therefore, a battery cover satisfying both the functional and aesthetic requirement is demanded.

It is the object of the present invention to provide an improved wireless mouse which has a detachable cover with shape similar to the top housing of the mouse and arranged upon the top housing and a battery chamber arranged beneath the cover, therefore, the detachable cover can be functioned as battery cover and will not influence the aesthetics of the mouse.

The various objects and advantages of the present invention will be more readily understood from the following detailed description when read in conjunction with the appended drawing, in which:

| Numeral | | | |
|---|---|---|---|
| 1 | mouse | | |
| 10 | base housing | 11 | battery cover |
| 110 | button | | |
| 2 | body | | |
| 20 | base housing | 200 | retaining block |
| 201 | elastic plate | 202 | ball |
| 203 | code wheel | 204 | circuit board |
| 21 | top housing | 210 | screw |
| 211 | retaining block | 212 | battery chamber |
| 213 | positioning hole | 214 | locking hole |
| 215 | hook | 22 | push-button case |
| 3 | cover | | |
| 30 | hook | 31 | positioning plate |

DETAIL DESCRIPTION OF PREFERRED EMBODIMENT

Figure 1:
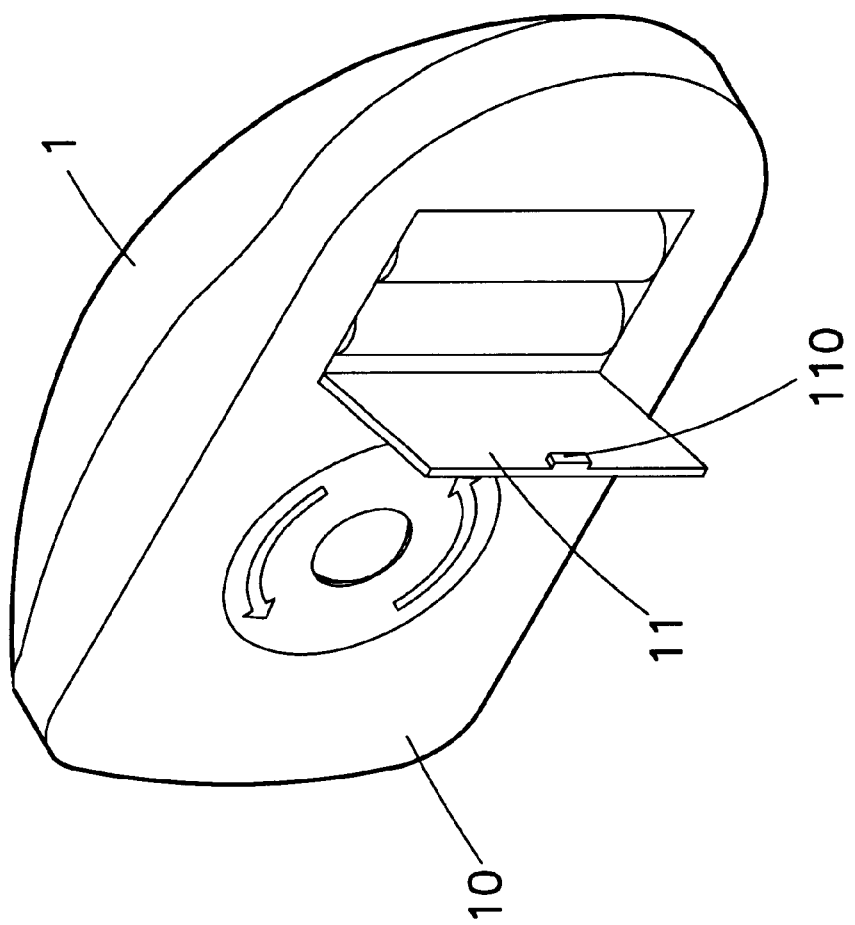
FIG. 1 is the bottom view of a conventional wireless mouse.
Figure 2:
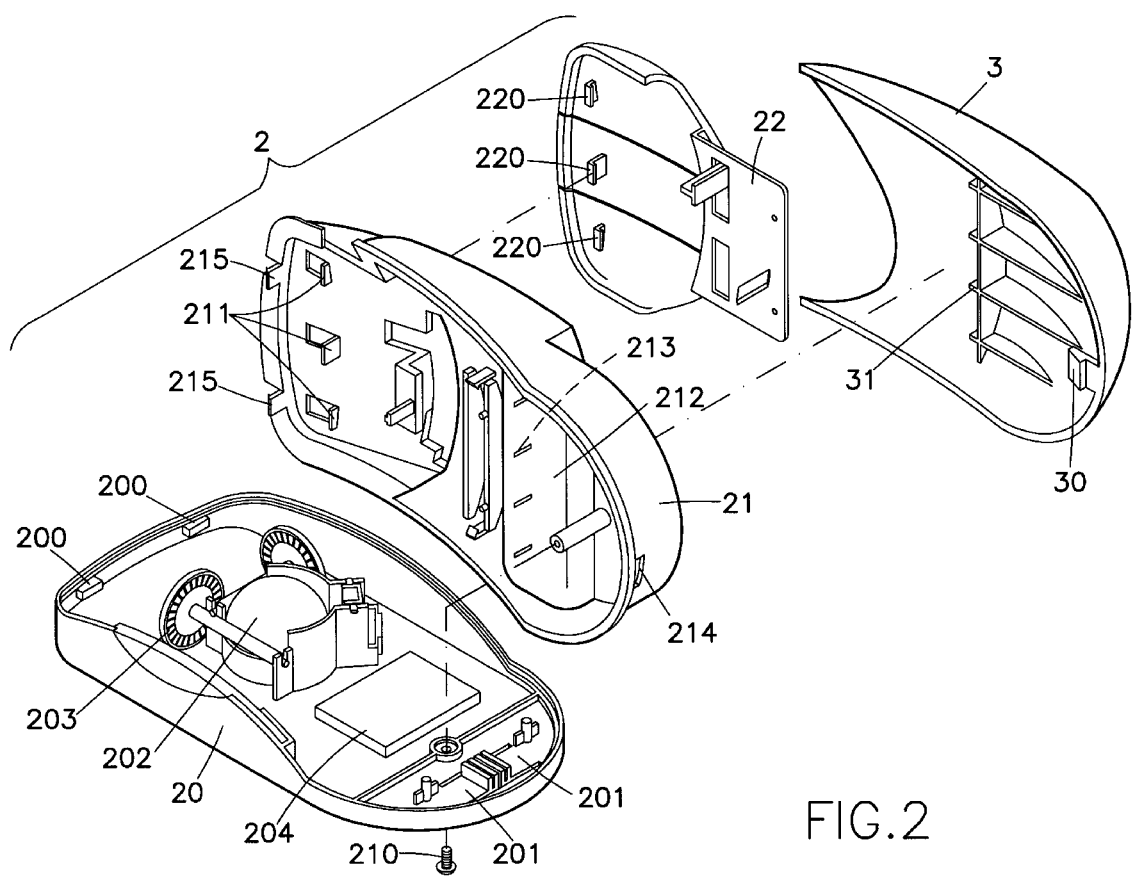
FIG. 2 is the exploded view of the wireless mouse according to the present invention.
Figure 3:
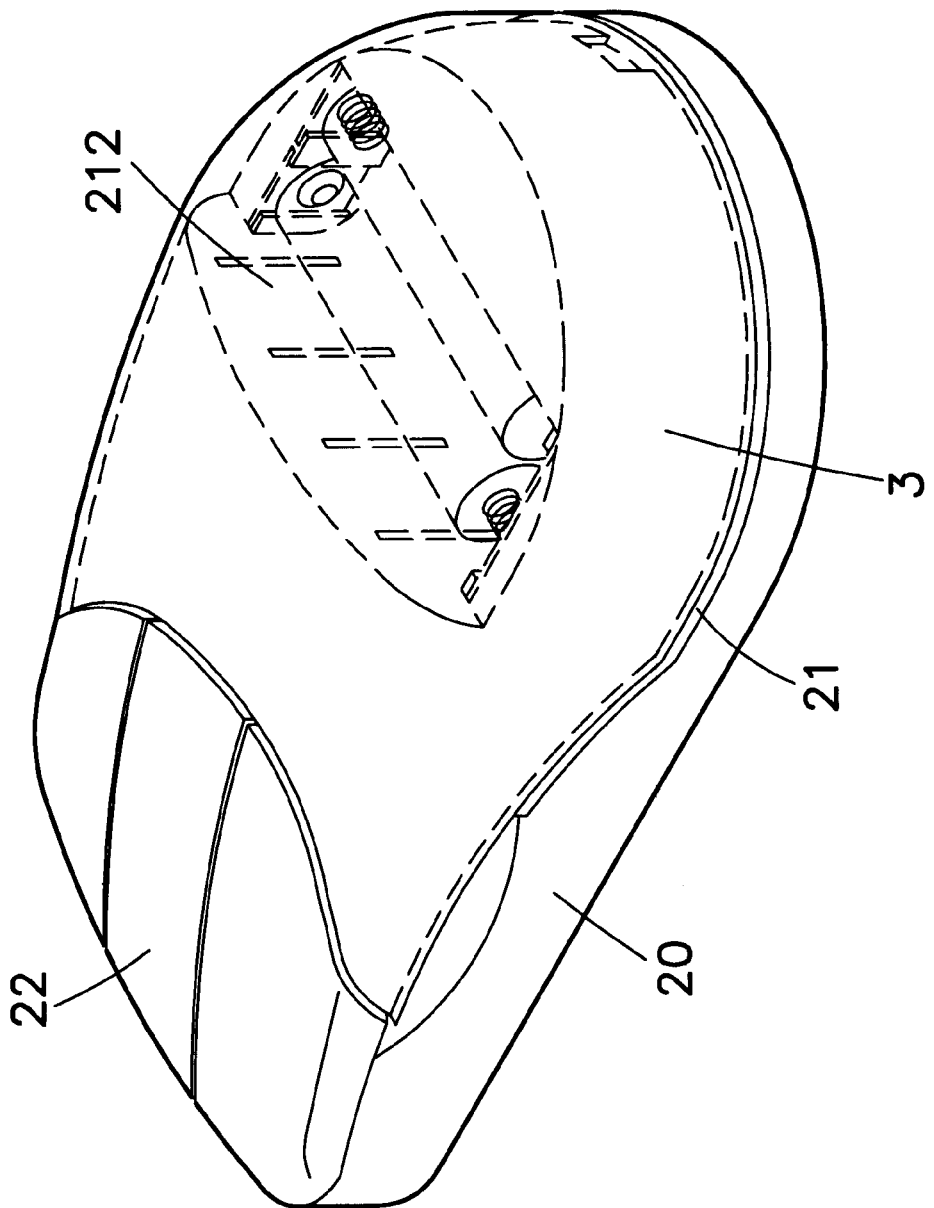
FIG. 3 is the perspective view of the of the wireless mouse according to the present invention.

FIGS. 2 and 3 show the exploded view and perspective view of the wireless mouse 1 according to the present invention. The computer mouse 1 comprises a main body 2 and a cover 3. The main body 2 of the mouse comprises a base housing 20, a top housing 21 and a push-button case 22.

The base housing 20 has two retaining blocks 200 on front side thereof, two C-shaped elastic plates 201 on rear side thereof which have one end in connection with the base housing 20. The other essential component of common mouse, that is, the ball 202, the code wheel 203 and the circuit board 204 are also arranged on the base housing 20. The top housing 21 is locked on the base housing 20 with a screw 210. The top housing 21 also have a plurality of retaining block 211 and hooks 215 locked with the hooking plates 220 of the push-button case 22 and the retaining blocks 200 of the base housing 20. Moreover, a top-opened battery chamber 212 is formed within the top housing 21. The battery chamber 212 has a plurality of vertical positioning holes 213 on front sidewall thereof. The top housing 21 has a locking hole 214 on rear side thereof.

The cover 3 has similar shape with that of the top housing 21 and can be covered on the rear portion of the top housing 21. The cover 3 has a hook 30 corresponding to the locking hole 214 on rear inner side thereof. The cover 3 has a plurality of positioning plates 31 corresponding to the positioning hole 213 on the front surface of the battery chamber 212.

Figure 4:
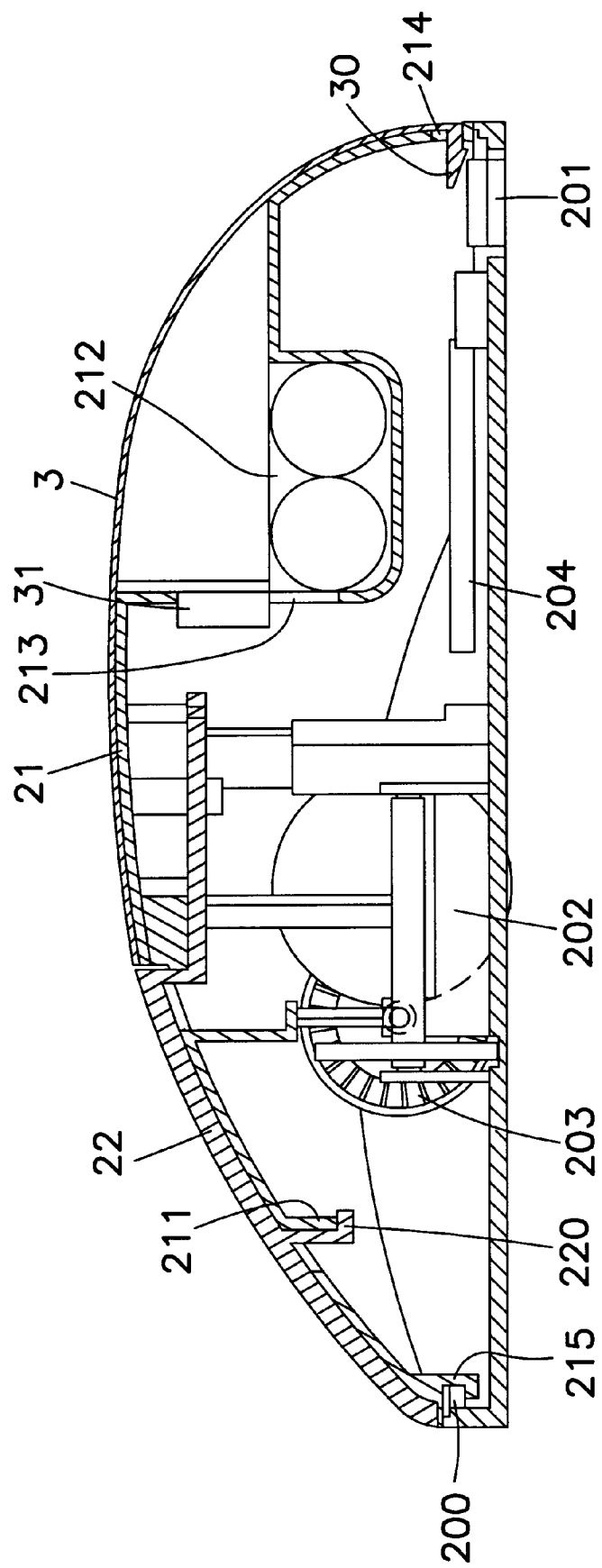
FIG. 4 is the cross-section view of the wireless mouse according to the present invention.

After batteries are placed within the battery chamber 212, the cover 3 is covered on the rear portion of the top housing 21 and pushed forward, whereby the hook 30 is engaged into the locking hole 214 of the top case 21 and locks the cover 3. Moreover, the positioning plates 31 are inserted into corresponding positioning hole 213 in the battery chamber 212. As shown in FIGS. 3 and 4, the cover 3 has similar shape to that of the top housing 21 of the computer mouse, therefore, the cover 3 can be functioned as battery cover while not influencing the outlook of the mouse.

Figure 5:
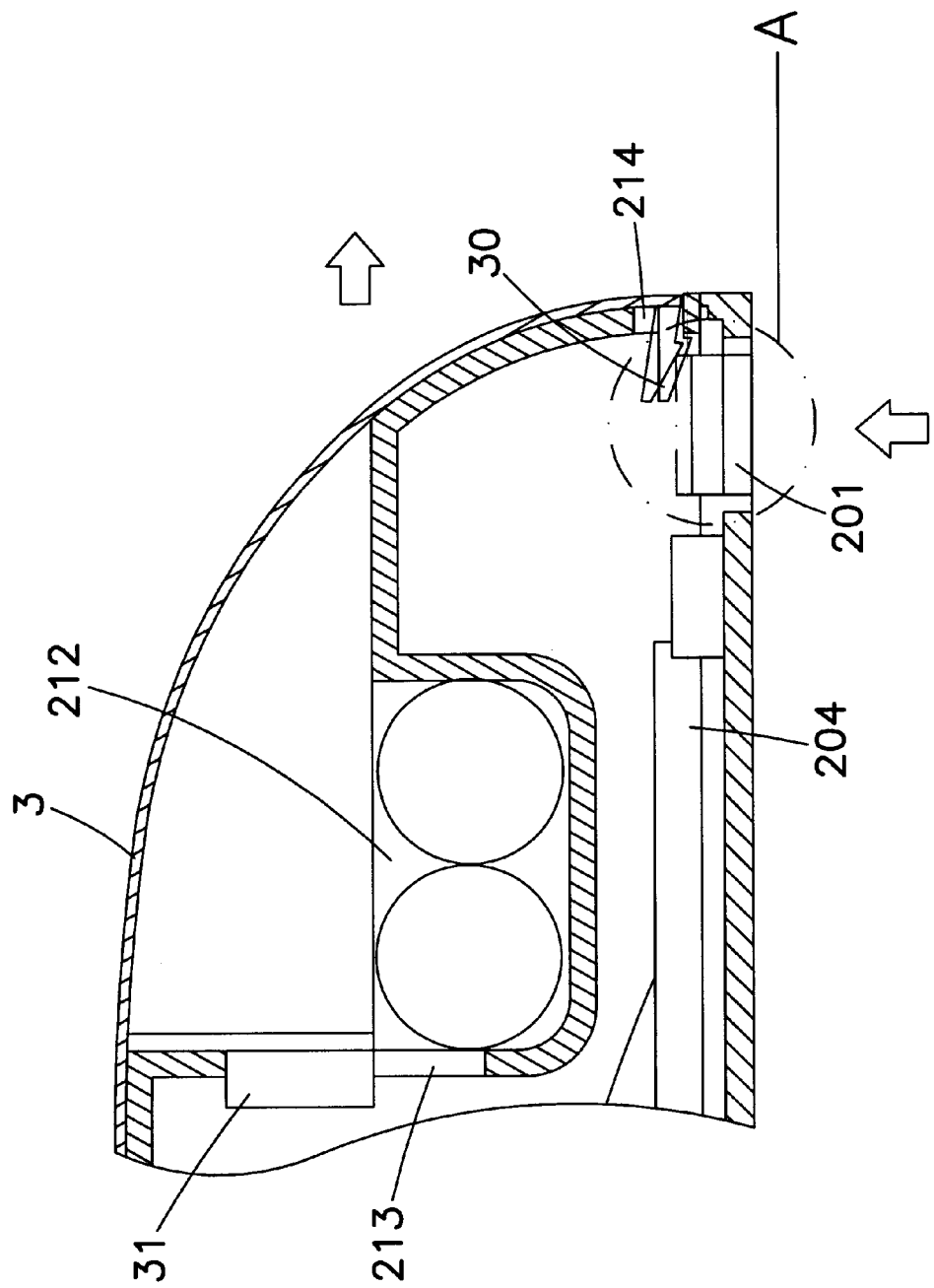
FIG. 5 is the partial cross-section view of the wireless mouse according to the present invention.
Figure 5A:
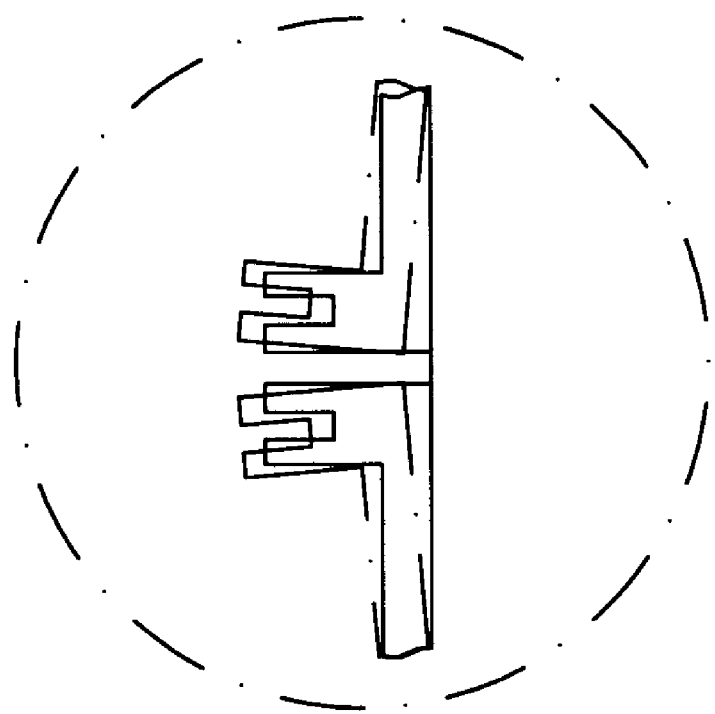
FIG. 5A is the partial enlarged view of FIG. 5's A according to the present invention.

As shown in FIG. 5, to release the cover 5, the user only need to press the elastic plate 201 on rear side of the base housing 20. The hook 30 will be pushed by the pressing force and separate with the locking hole 214. Afterward, the cover 3 is dragged backward to expose the battery chamber 212, thus facilitating the battery inspection and replacement.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A wireless computer mouse, comprising a mouse main body and a cover, said main body having a base housing, a top housing and a push-button case, said mouse characterized in that said cover has shape similar to that of said top housing, and has a hook on rear side thereof and at least one positioning plate on front side thereof, said top housing has a battery chamber therein, at least one positioning hole on the side wall of said battery chamber, locking hole on rear side of said chamber, when said cover is covered on said top housing and pushed forward, said hook is locked with said locking hole and said positioning plates are engaged into said positioning holes.

2. The mouse as in claim 1, wherein an elastic plate is arranged on the rear side of said base housing and corresponding to said hook engaged into said locking hole, whereby said hook can be released from said locking hole by pressing said elastic plate.

* * * * *